(12) United States Patent
Gevka et al.

(10) Patent No.: US 10,606,923 B1
(45) Date of Patent: *Mar. 31, 2020

(54) DISTRIBUTING CONTENT VIA CONTENT PUBLISHING PLATFORMS

(71) Applicant: Facebook, Inc., Menlo Park, CA (US)

(72) Inventors: Igor Gevka, Palo Alto, CA (US); Yufei Chen, Sunnyvale, CA (US); Sarang Mohan Joshi, Austin, TX (US); Hongda Ma, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/247,973

(22) Filed: Jan. 15, 2019

Related U.S. Application Data

(63) Continuation of application No. 15/167,873, filed on May 27, 2016, now Pat. No. 10,198,403.

(51) Int. Cl.
*G06F 15/00* (2006.01)
*G06F 17/21* (2006.01)
(Continued)

(52) U.S. Cl.
CPC ........ *G06F 17/211* (2013.01); *G06F 16/3344* (2019.01); *G06F 16/955* (2019.01);
(Continued)

(58) Field of Classification Search
CPC .. G06F 17/211; G06F 17/212; G06F 17/2247; G06F 17/3089; G06F 17/30684;
(Continued)

(56) References Cited

U.S. PATENT DOCUMENTS

| 8,443,005 B1 | 5/2013 | Goldman et al. |
| 8,621,215 B1 | 12/2013 | Iyer |

(Continued)

OTHER PUBLICATIONS

Lessin, S., et al., "Providing a Claims-Based Profile in a Social Networking System," U.S. Appl. No. 13/455,050, filed Apr. 24, 2012.

*Primary Examiner* — Scott T Baderman
*Assistant Examiner* — Hassan Mrabi
(74) *Attorney, Agent, or Firm* — Fenwick & West LLP

(57) ABSTRACT

Content provider systems publish content via content publishing platforms. An online system is associated with multiple content publishing platforms. Each content publishing platform is associated with policies that determine whether a content item is acceptable for publishing via the content publishing platform. For example, the policy may specify dimensions of a media object of the content item, keywords that are unacceptable for publishing via the content publishing platform, and so on. The online system receives requests from content provider systems to publish content via a particular content publishing platform. The online system determines whether the content item is suitable for publishing via one or more other content publishing platforms. The online system determines whether the content provider system approves publishing content via any of the identified content publishing platforms. The online system may deliver the content item to all content publishing platforms approved by the content provider system.

20 Claims, 5 Drawing Sheets

(51) Int. Cl.
*G06F 17/22* (2006.01)
*G06F 16/958* (2019.01)
*G06F 16/33* (2019.01)
*G06F 16/955* (2019.01)

(52) U.S. Cl.
CPC ........ *G06F 16/958* (2019.01); *G06F 17/2229* (2013.01); *G06F 17/2247* (2013.01); *G06F 17/2264* (2013.01)

(58) Field of Classification Search
CPC ........... G06F 17/30876; G06F 17/2229; G06F 17/2264
USPC ........................................................ 715/201
See application file for complete search history.

(56) References Cited

U.S. PATENT DOCUMENTS

| | | | |
|---|---|---|---|
| 2002/0156702 A1* | 10/2002 | Kane | G06Q 10/10 705/27.1 |
| 2006/0224943 A1 | 10/2006 | Snyder et al. | |
| 2010/0076994 A1* | 3/2010 | Soroca | G06F 16/68 707/769 |
| 2011/0112899 A1* | 5/2011 | Strutton | G06Q 30/02 705/14.41 |
| 2013/0030909 A1* | 1/2013 | Shih | G06Q 30/0277 705/14.48 |
| 2013/0036458 A1 | 2/2013 | Liberman et al. | |
| 2013/0159094 A1 | 6/2013 | McClelland et al. | |
| 2014/0006977 A1* | 1/2014 | Adams | H04L 51/32 715/758 |
| 2014/0129312 A1 | 5/2014 | Grishaver | |
| 2014/0188615 A1 | 7/2014 | Badenhop | |
| 2014/0214557 A1 | 7/2014 | Varghese et al. | |
| 2014/0214558 A1 | 7/2014 | Varghese et al. | |
| 2015/0112814 A1* | 4/2015 | Stokes | G06Q 30/0276 705/14.66 |
| 2015/0156159 A1 | 6/2015 | Hanson et al. | |
| 2015/0186381 A1* | 7/2015 | Yan | G06F 16/14 707/728 |
| 2017/0024360 A1 | 1/2017 | Lu | |

* cited by examiner

DISTRIBUTING CONTENT VIA CONTENT PUBLISHING PLATFORMS

CROSS REFERENCE TO RELATED APPLICATIONS

This application is a continuation of co-pending U.S. application Ser. No. 15/167,873, filed May 27, 2016, which is incorporated by reference in its entirety.

BACKGROUND

This disclosure relates generally to distribution of content via content publishing platforms, and in particular, to distributing content via multiple content publishing platforms associated with an online system.

Content providers publish content via content publishing platforms. Different content publishing platforms offer different types of information and different features. Various users access the content publishing systems for the features offered by the content publishing systems and the content published by the content publishing systems. For example, a particular content publishing platform may allow users to interact with each other in relation to a published content. Another content publishing platform may allow users to share content published via the platform. The set of users that access a particular content sharing platform may be different from the set of users that access another content publishing platform.

Content providers may not be aware of the various content publishing systems that they can avail of while publishing their content. Accordingly, the users that they reach are often limited to the set of users of a specific content publishing platform that they chose. Content publishers would like to increase the number of users to which they provide their content.

SUMMARY

An online system is associated with a plurality of content publishing platforms. Each content publishing platform is associated with policies that determine whether a given content item qualifies for publication by the content publishing platform. For example, a content publishing platform may have a policy that specifies constraints on dimensions of media objects of a content item. Accordingly, a content item can be published by the content publishing platform if any media objects of the content item satisfy the constraints specified by the policy. The online system receives a content item from a content provider system for publishing in a content publishing platform. The online system identifies other content publishing platforms for which the content item qualifies for publication and recommends these additional content publishing platforms to the content provider system. The online system delivers the content item for publishing by the additional content publishing platforms if the online system receives an approval from the content provider systems. Therefore, embodiments allow distribution of a content item to a larger target audience than originally requested by the content provider system.

In an embodiment, the online system stores rules implementing the policies associated with content publishing platforms. For example, a rule associated with a policy may represent an expression based on attributes of a content item such that if the rule evaluates to true, the content item complies with the policy and if the rule evaluates to false, the content item does not comply with the policy. The online system executes the rules associated with a content publishing platform to determine whether the content item complies with the policies of the content publishing platform.

If the online system determines that a content item complies with the rules associated with a given content publishing platform, the online system sends a recommendation to the content provider system identifying the content publishing platform for publishing the content item in addition to the content publishing platform originally requested by the content provider system.

In an embodiment, if the online system determines that, if the content does not comply with the rules associated with a given platform, the online system determines if the content item can be modified to conform to the policies of the content publishing platform. If the online system determines that certain modifications to the content item cause the content item to comply with the policies of the content publishing platform, the online system recommends these modifications to the content publishing platform. The online system may receive a modified content item from the content provider system such that the modified content item incorporates the recommended modifications or the online system makes the suggested modifications if approved by the content provider system. The online system delivers the content item via the content publishing platforms approved by the content provider system.

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

System Environment

Figure 1:
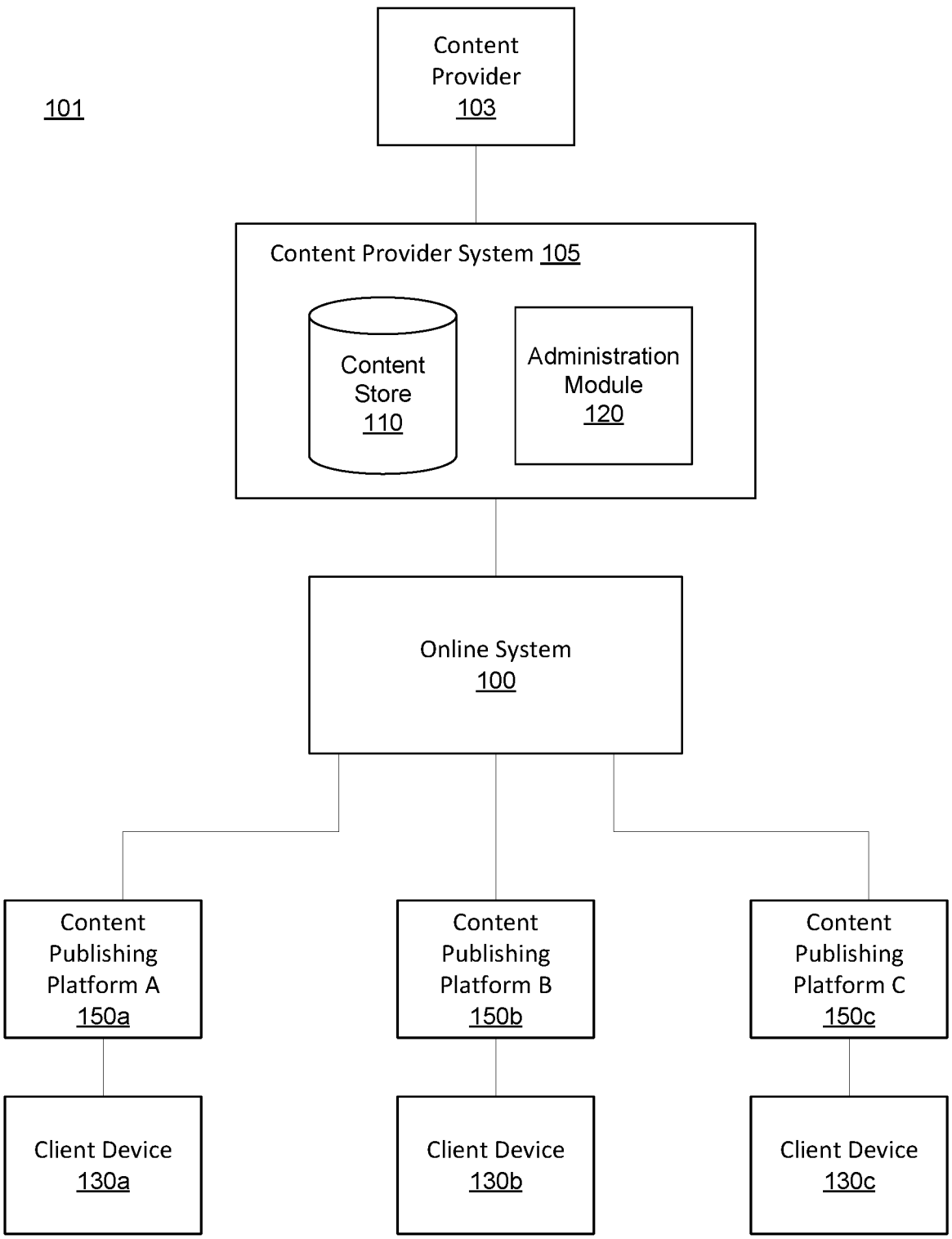
FIG. 1 is a block diagram of a system environment in which an online system operates, in accordance with an embodiment of the disclosure.

FIG. 1 is a block diagram of a system environment in which an online system operates, in accordance with an embodiment of the disclosure. The system environment 101 shown by FIG. 1 includes a content provider system 105, an online system 100, a set of content publishing platforms (150a, 150b and 150c), and a set of client devices (130a, 130b and 130c). In alternative configurations, different and/or additional components may be included in the system environment 101.

The online system 100 is associated with a plurality of content publishing platforms 150. The online system 100 receives content from the content provider system 105 for publishing via one or more content publishing platforms

150. The content provider system 105 typically identifies a particular content publishing platform 150 for publishing a content item. The online system 100 determines whether the given content item can be published via one or more other content publishing platforms 150 that were not identified by the content provider system 105. The online system 100 determines that a content item can be published via a content publishing platform 150 if the content item conforms to a set of policies associated with the content publishing platform 150. For example, the policies may specify attributes or properties of the video, audio, text, or images of the content item that should be satisfied by the content item to qualify for publishing by the content publishing platform 150.

If the online system 100 determines that the given content item qualifies for publication by one or more other content publishing platforms 150, the online system 100 interacts with the content provider system 105 to determine whether the content item can be published via the one or more other content publishing platforms 150 in addition to the content publishing platform 150 originally identified by the content provider system 105. If the online system 100 receives an approval from the content provider system 105, the online system 100 delivers the content item to the content publishing platform 150 originally identified by the content provider system 105 as well as any content publishing platforms 150 approved by the content provider system 105 in addition.

The content provider system 105 receives content from content providers 103. The content providers 103 may be client devices of users that include amateurs or professional users that generate content. Content received from content providers 103 includes text, video, audio, images, and the like. The content provider system 105 stores the received content items in the content store 110. The content store 110 stores the content item as well as metadata associated with the content item. The metadata associated with the content item includes information identifying the content provider 103 that provided the content item, time at which the content item was received or updated, any special instructions or comments associated with the content item, and so on.

The content provider system 105 includes an administration module 120 that allows a user, for example, system administrator to interact with the content provider system. A system administrator of the content provider system 105 identifies a particular content publishing platform associated with the online system in connection with a given content item. The content provider system 105 provides instructions to the online system 100 to publish the content item via the selected content publishing system 130.

The online system 100 offers various features to the users of the online system 100. Users of the online system may create user accounts that are stored by the online system. In an embodiment, the online system 100 is a social networking system that allows users to establish connections with other users. The online system 100 allows users to interact with their connections or other users. The online system 100 provides information describing other users connected to a user to the user, for example, as news feed.

The online system 100 is associated with one or more content publishing platforms 150. The online system 100 may be associated with multiple content publishing platforms 150 for various reasons. For example, each content publishing platform 150 may be developed separately to offer certain features and the online system 100 may interact with the content publishing platforms 150 to provide users of the online system 100 with access to features of the content publishing platforms 150. Alternatively, one or more content publishing platforms 150 may be associated with different vendors and the online system may be associated with the one or more content publishing platforms 150 as a result of an agreement, for example, a business agreement between parties managing the online system and vendors of the one or more content publishing platforms 150. Alternatively, the content publishing platforms may have been developed as part of the online system 100 and then separated as independent platforms with which the online system 100 continues to interact. In an embodiment, a content publishing platform 150 is a part of the online system, for example, a sub-system of the online system 100. The online system 100 may be associated with multiple content publishing platforms 150 for a combination of reasons, for example, for several or all reasons listed above.

A content publishing platform 150 publishes content received from content providers. In an embodiment, a content publishing platform 150 allows the online system 100 to publish content. The content publishing platform 1550 includes code or instructions for receiving content, storing content, and for distributing content to users. The content publishing platform 150 may include servers, for example web servers that host the content for access by users.

As an example, the content publishing platform may represent a media sharing platform (e.g. INSTAGRAM), wherein the user uses the client device 180 to share media objects and to view media objects shared by other users of the content publishing platform 150. Alternatively, the content publishing platform 150 may be part of the online system 100 that distributes content published by other users as well as content received from content provider systems. In an embodiment, the online system 100 is a social networking system. A portion of the social networking system acts as a content publishing platform by distributing content as news feed items to users of the social networking system.

Users associated with the online system 100 receive content published by the content provider system 105 via client devices 130. The content published via a content publishing platform 150 may be content received from users of the online system 100 or from content provider systems 105. For example, a user may upload a video and share with other users via a content publishing platform 150. The online system 100 may also provide content received from a content provider system 105 to users of the online system. The online system 100 may receive compensation from the content provider systems 105 for distributing their content via the content publishing platforms 150. Accordingly, the content distributed by the online system via the content publishing platforms can be promotional content or sponsored content.

The online system 100, receives the content from content provider systems 105, and analyzes the content to verify if the content complies with the rules corresponding to various policies associated with various content publishing platforms 150. The online system 100, is further described with reference to FIG. 2. In an embodiment, the online system 100 stores rules corresponding to various policies, and executes the rules. The online system 100 uses the result of execution of the rules to determine the compliance with the policies of a content publishing platform.

The client devices 130 are one or more computing devices capable of receiving user input as well as transmitting and/or receiving data via the network not shown in FIG. 1. In one embodiment, a client device 180 is a conventional computer system, such as a desktop or laptop computer. Alternatively, a client device 180 may be a device having computer functionality, such as a personal digital assistant (PDA), a mobile telephone, a smartphone or another suitable device. A client device 180 is configured to communicate via the network. In one embodiment, a client device 180 executes a client application allowing a user of the client device 180 to interact with platform A 150. Content publishing platforms may receive content from users for publishing, for example, comments, videos, images, etc. published by users. In addition to content received from users, the content publishing platforms 150 publish content received from the content provider system 105.

The user uses the client device 180 to view content items published by the content publishing platform 150 received from the content provider system 105. The client device 180 executes a browser application to enable interaction between the client device 180 and the content publishing platforms 150 via the network. In another embodiment, a client device 180 interacts with content publishing platforms 150 through an application programming interface (API) running on a native operating system of the client device 180, such as IOS® or ANDROID™.

System Architecture

Figure 2:
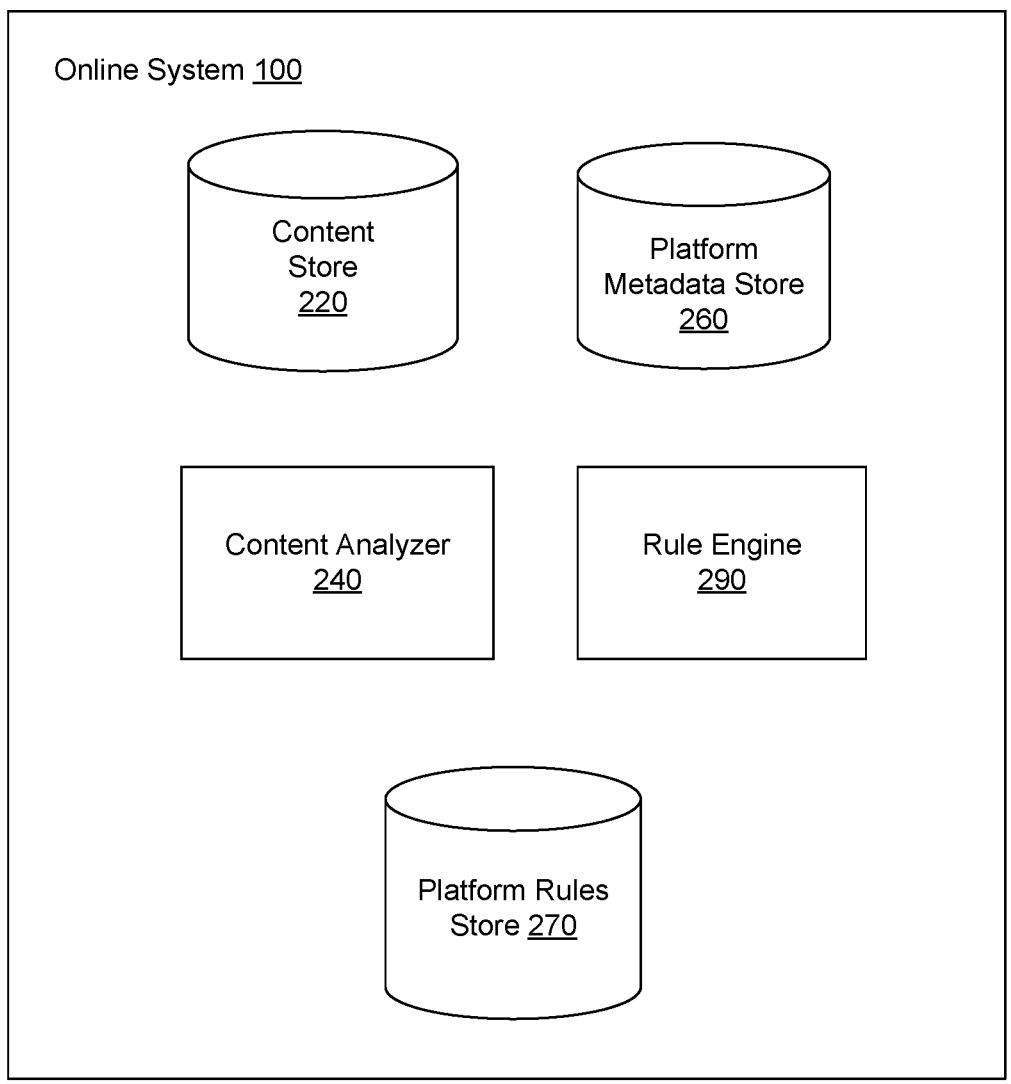
FIG. 2 is an overview of architecture of online system, in accordance with an embodiment of the disclosure.

FIG. 2 is an overview of architecture of an online system, in accordance with an embodiment of the disclosure. The online system 100 shown in FIG. 2 includes a content store 220, a recommendation module 230, a platform metadata store 260, a content analyzer 240, a platform rules store 270, and a rule engine 290. In other embodiments, the online system 100 may include additional, fewer, or different components for various applications.

The content analyzer 240 receives content items from content provider systems 105 for publishing via a particular content publishing system 150. The content analyzer 240 stores the received content item in the content store 220. The content analyzer 240 also determines metadata describing the content item and stores the metadata in the content store 220. The content analyzer 240 determines whether the received content item is suitable for publishing via one or more other content publishing systems 150, in addition to the content publishing system 150 specified by the content provider system 105. The content analyzer 240 sends a recommendation to the content provider system 105 identifying the one or more other content publishing systems 150 to determine if the content provider system 105 approves publishing the content item in any additional content publishing system 150. The content analyzer 240 comprises a machine-learning system that generates models for scoring the content items received from content provider systems 105.

The content store 220 stores data and metadata describing content items received from content provider systems 105. Examples of components of a content stored in the content store 220 include, title, body, image, and landing page of the content. The content analyzer 240 identifies different components of content and stores them in the content store 220. The content analyzer 240 analyzes the components of a content item to determine metadata describing the content. For example, the content analyzer 240 may identify an image in the content, and identify various tags of the image, dimensions of the image, and may perform object recognition on the image to determine if the image contains objectionable content.

The content store 220 stores information identifying a content provider system 105 that provided the content item and one or more users associated with the content provider system 105, for example, administrators or representatives of the content provider system 105. The information identifying users (or administrators) associated with a content provider system 105 is used by the content analyzer 240 to send recommendations of content publishing platforms for a content item received from the content provider system 105 to the users associated with the content provider system 105.

In another example, if the content item includes text, content analyzer 240 analyzes the text to determine attributes of the text and stores the attributes as metadata in the content store 220. The content analyzer 240 extracts keywords from the text associated with the content item and determines whether the keywords satisfy certain criteria. For example, the content analyzer 240 determines whether the text includes profanity by matching keywords extracted from the text against a set of keywords predetermined to be profane. In an embodiment, the content analyzer 240 converts audio information from a content item into text by transcribing the audio and stores the text and metadata describing the text in the content store 220 in association with the content item.

In an embodiment, the content store 220 is implemented as a relational database that stores tables representing relations between various entities represented in the database. The content store 220 stores a table representing metadata as name value pairs. A set of name value pairs is associated with a content item. The content item is associated with an identifier that uniquely identifies the content item. Accordingly, the name value pairs representing metadata for a content item are associated with the identifier of the content item. The online system 100 may retrieve all name value pairs representing metadata for a content item and store them in cache that allows efficient access of the information. The data stored in the cache is available for access by various modules of the online system 100.

The platform metadata store 260 stores the information describing different content publishing platforms associated with the online system 100. The platform metadata store 260 stores a unique platform identifier for each content publishing platform 150. The platform metadata store 260 store information identifying one or more users or administrators associated with the content publishing platform 150.

The platform metadata store 260 stores information used for establishing a connection with the content publishing platform 150 for delivering content via the content publishing platform. The information may include at least authentication information, a URL for accessing the content publishing platform, and so on. For example, the authentication information can represent the login details such as a passcode and any other information used for creating a connection with the content publishing platform.

In an embodiment, the platform metadata store 260 stores dictionaries comprising keywords associated with the content publishing platforms 150. The dictionary stores keywords that represent acceptable or unacceptable terms for the content published via the content publishing platform. For example, a dictionary may store keywords that represent terms that are classified as unacceptable terms for the content published via a content publishing platform 150. The content analyzer 240 uses the dictionary to determine whether a content item includes terms or keywords that are unacceptable for publishing via a content publishing platform 150, for example, terms or keywords that include profanity.

The platform rules store 270 stores the rules defined by the online system 100 for determining whether various content items are compatible with certain content publishing platforms 150. The rules defined by the online system 100 represent policies of each content publishing platform. For example, a rule may determine whether the text of a content item includes profanity. A rule may determine whether dimensions of an image included in a content item exceed certain threshold values.

In an embodiment, the platform rules store 270 is implemented as a relational database that maps identifiers of content publishing platforms to rules implementing policies of the content publishing platforms. In an embodiment, the online system 100 represents rules as expressions representing conditions based on attributes describing the content item. For example, if the conditions corresponding to a rule evaluate to true for a content item, the content item is validated with respect to that rule and accordingly complies with the policy associated with the rule. If a content item is validated with respect to all the rules for a content publishing platform, the content analyzer 240 determines that the content item is suitable for publishing via the content publishing platform. A rule is associated with a policy and may be shared across a plurality of content publishing platforms that implement the corresponding policy.

A platform rules store 270 may represent a rule using a particular syntax of a language that allows representation of expressions. The language may be a proprietary language or a commonly used programming language. In an embodiment, the platform rules store 270 stores rules using a markup language, for example, the extensible markup language (XML).

The rule engine 290 receives a content item and executes rules corresponding to various content publishing platforms 150. The rule engine 290 retrieves a set of rules for a particular content publishing platform. The rule engine 290 executes all the rules of the content publishing platform for the given content item. The rule engine 290 parses each rule to build a data structure representing a rule. In an embodiment, the rule engine 290 builds a parse tree representation of a rule and generates an in-memory data structure representing the rule based on the parse tree representation. The in-memory data structure allows the rule engine 290 to access the various parts of the rule and to execute the rule. The rule engine provides the results of execution of the rules to the content analyzer 240.

In an embodiment, the content analyzer 240 determines if specific components do not satisfy one or more policies of a content publishing platform 150 and sends suggestions for modifying the content items to comply with the policies of the content publishing platform 150. For example, the content analyzer 240 may identify keywords that are considered offensive based on comparison with terms stored in a dictionary of terms considered offensive by a particular content publishing platform 150. The content analyzer 240 sends a list of the identified terms to an administrator of the content provider 103. The online system 100 may receive a revised content item which has been modified to comply with the policies of the content publishing system 150. The online system 100 delivers the revised content item for publication by the content publishing system 150.

In an embodiment, the content analyzer 240 identifies the components that cause a content item to fail to comply with certain policies of a content publishing system and modifies the components to comply with the policies. For example, the content rule engine 290 may determine that an image exceeds certain threshold values specified by a content publishing platform 150. The content analyzer 240 modifies the image to change the dimensions, for example, by reducing the size of the image. Alternatively, if a rule requires the image to be a particular shape, the content analyzer 240 crops the image to match the shape specified by the rule. As another example, if the text contains keywords that are unacceptable to the content publishing platform, the content analyzer 240 may modify the text or the corresponding audio to mask the offending keywords with redacted text or beeping audio sounds respectively.

The online system 100 may send the modified content item to an administrator of the content provider 103 for approval. The online system 100 sends the modified content item to the content publishing platform 150 for publication if the administrator approves the publication of the content item.

Validation of Rule Check

Figure 3:
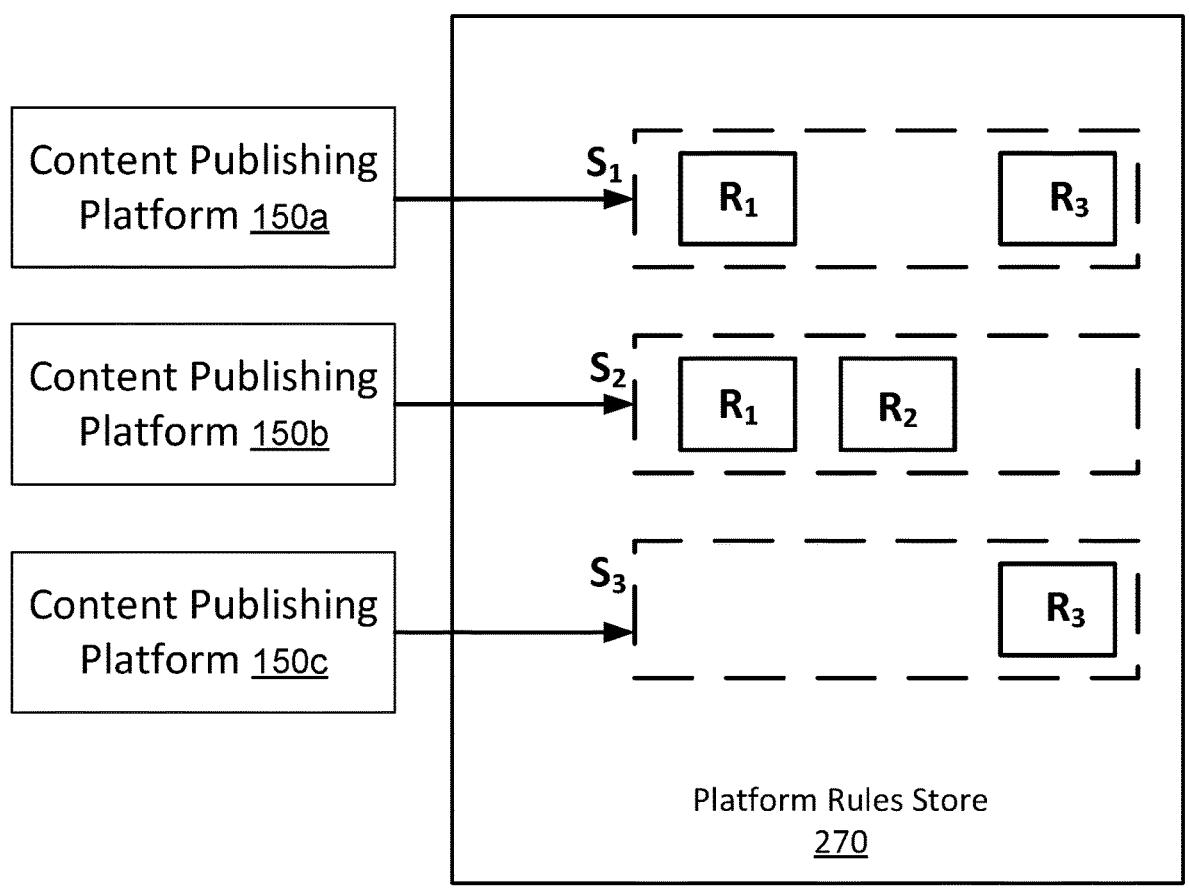
FIG. 3 shows an example set of rules stored in the platform rule store for a set of content publishing platforms, in accordance with an embodiment of the disclosure.

FIG. 3 shows an example set of rules stored in the platform rule store for a set of content publishing platforms, in accordance with an embodiment of the disclosure. The number of content publishing platforms associated with an online system may be more or fewer than those illustrated in FIG. 3. Furthermore, the number of rules associated with each content publishing platform 150 may be more or fewer than those illustrated in FIG. 3.

As shown in FIG. 3, content publishing platform 150a maps to a set $S_1$ of policies implemented as rules $R_1$ and $R_3$ stored in the platform rules store 270. Similarly, content publishing platform 150b maps to a set $S_2$ of policies implemented as rules $R_1$ and $R_2$ stored in the platform rules store 270 and content publishing platform 150c maps to a set $S_3$ of policies implemented as rule $R_3$ stored in the platform rules store 270. As shown in FIG. 3, various content publishing platforms may have overlapping policies as indicated by the rules shared across the content publishing platforms. For example, rule $R_1$ is common across content publishing platforms 150a and 150b and rule $R_3$ is common across content publishing platforms 150a and 150c.

As an example, assume that the online system 100 receives a request to publish a content item via content publishing platform 150c which maps to a set $S_3$ of rules with only rule $R_3$ matching with the content. However, the online system 100 may determine that same content also matches with the set of rules $S_1$ which comprises rules $R_1$ and $R_3$. The online system 100 sends a recommendation to the content provider system 105, suggesting the content provider system 105 to publish the content item via content publishing platform A.

Hierarchy of Rules

In an embodiment, the platform rules store 270 stores the rules as a hierarchy. The online system 100 identifies sets of rules that are common across sets of content publishing platforms 150 and represents the common set of rules as a separate set. A content publishing platform 150 may have rules in addition to the common set of rules.

Figure 4:
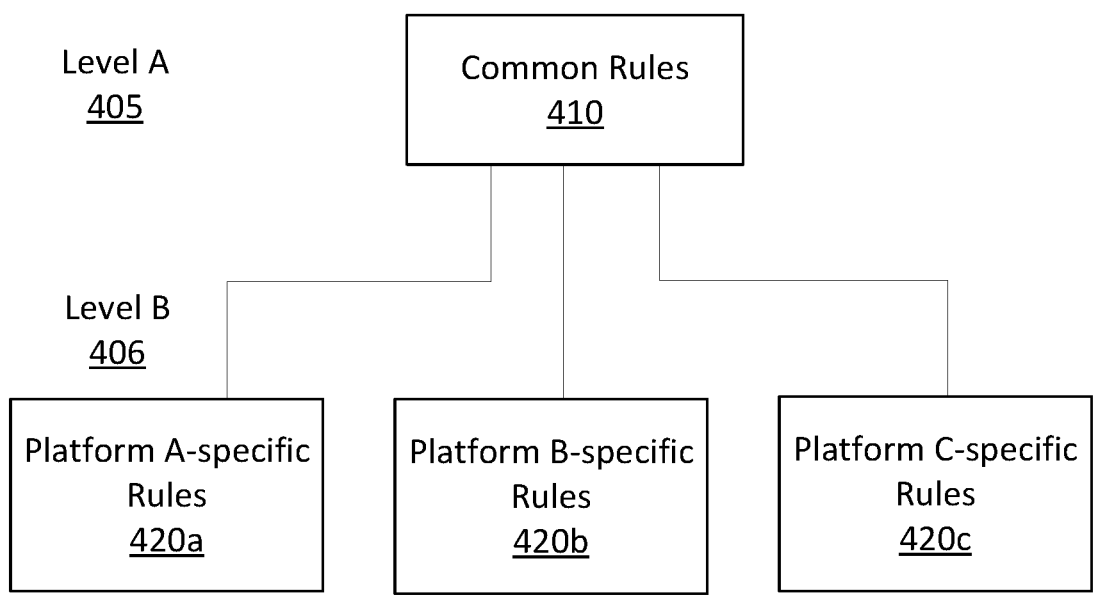
FIG. 4 is an illustration of a hierarchy of policies of a plurality of content publishing platforms, in accordance with an embodiment of the disclosure.

FIG. 4 is an illustration of a hierarchy of policies of a plurality of content publishing platforms, in accordance with an embodiment of the disclosure. As shown in FIG. 4, the platform rules store 270 organizes the rules as a hierarchy. Accordingly, the rules comprise a common set of rules that apply across all content publishing platforms and sets of rules that are specific to individual platforms. In an embodiment, the hierarchy has multiple levels in which intermediate levels comprise sets of rules shared by a subset of platforms.

In one example of FIG. 4, the online system 100 follows a two-level hierarchy of rules with rules that are common to all the platforms placed at a higher level (indicated as level A) and rules that are specific to a given platform are placed at the lower level (indicated as level B). Level A 405 represent the top of the hierarchy with the common rules 410 representing rules applicable to all the content publishing platforms 420.

In an embodiment, the online system 100 execute rules from the set of common rules 410 in level A and then executes the rule with platform-specific rules in level B. The online system 100 may execute the rules from the platform specific rules in parallel (or concurrently). This allows the online system 100 to determine early if the content item does not comply with one or more content publishing platforms, for example, as a result of a failure of the content item to comply with a rule that is common across a subset of content publishing platforms.

Identifying Content Publishing Platforms for a Content Item

Figure 5:
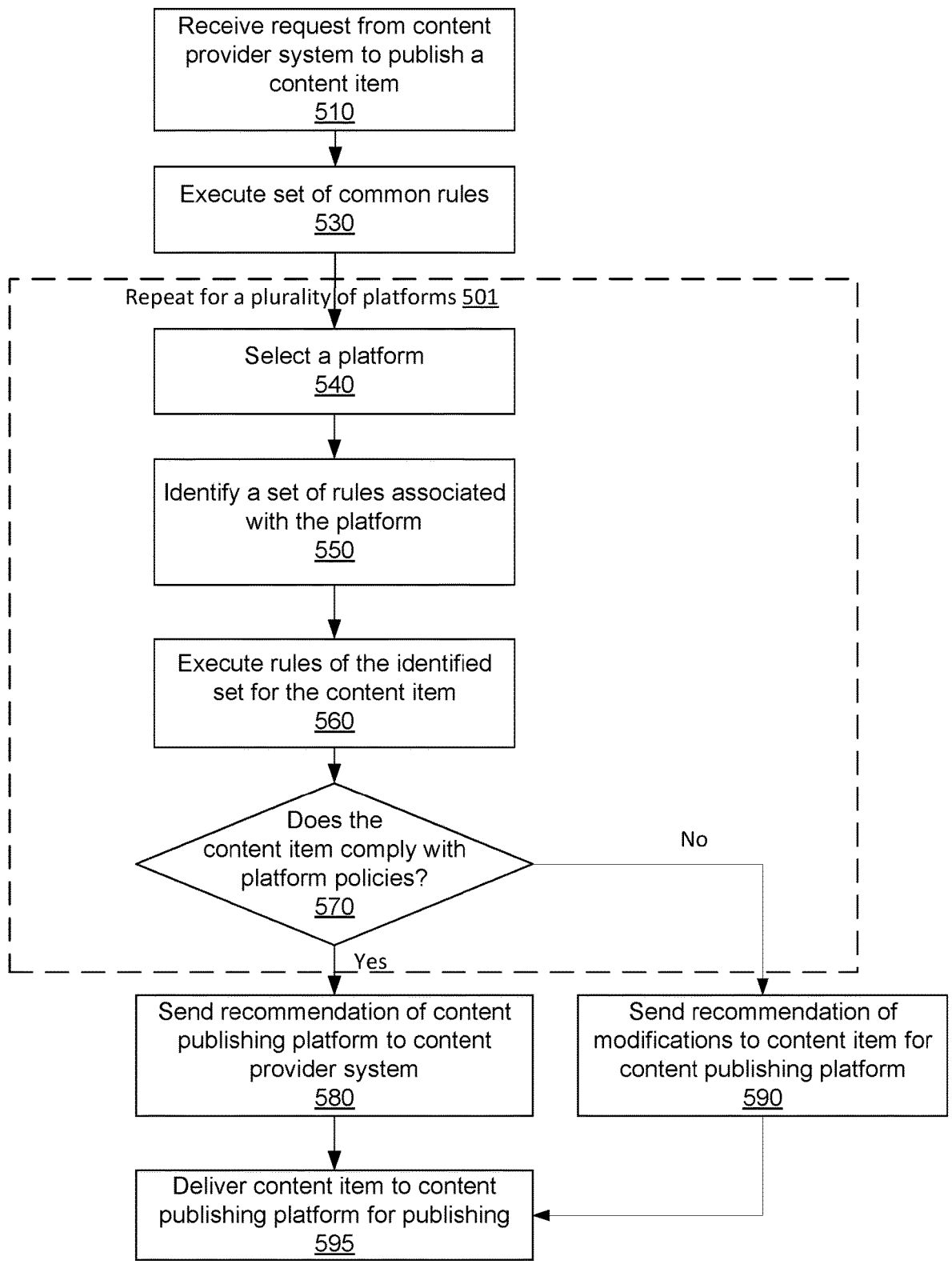
FIG. 5 is a flowchart showing the overall process of identifying additional content publishing platforms for a content item received by the online system, in accordance with an embodiment of the disclosure.

FIG. 5 is a flowchart showing the overall process of identifying additional content publishing platforms for a content item received by the online system, in accordance with an embodiment of the disclosure.

The online system 100 receives 510 a request from a content provider system 105 to publish a content item. The request received 510 by the online system 100 includes information identifying a target content publishing platform for publishing the content item.

The online system 100 determines whether the content item complies with the policies of various content publishing platforms 150 associated with the online system 100. The content analyzer 240 determines whether the content item complies with all policies of a content publishing platform 150 based on the execution of the rules. In an embodiment, content analyzer 240 first executes 530 the common rules 410 received from the platform rules store 270 and subsequently executes platform specific rules for each content publishing platform 150. The content analyzer 240 may execute the rules of the various content publishing platforms 150 in any other order, for example, by executing all the rules of a content publishing platform 150 before starting execution of the rules of another content publishing platform 150. If the content analyzer 240 uses the results of execution of each rule to determine whether the content item complies with a policy associated the content publishing platform 150. For example, if the content analyzer 240 executes a rule and determines that a rule evaluates to false, the content analyzer 240 stores an indication that a policy defined by the rule is violated by the content item.

The common rules 410 are applicable to a plurality of content publishing platforms 150. For example, the common rules may be applicable to all content publishing platforms 150 or to a subset of content publishing platforms 150. If the content analyzer 240 determines that a content rule evaluates to false, the content analyzer 240 determines that the policy corresponding to the rule is violated for all content publishing platforms implementing that policy.

The online system 100 repeats the steps 540, 550, 560, and 570 for each content publishing platform 150. The online system 100 selects 540 a content publishing platform and retrieves metadata describing the selected content publishing platform from the platform metadata store 260. The rule engine 290 identifies 550 a set of rules associated with the selected content publishing platform. These rules are platform specific rules 420, i.e., rules associated with the selected content publishing platform 150 that are in addition to any common rules previously executed 530. The rule engine 290 executes 560 rules of the identified set of rules for the content item. The content analyzer 240 uses the results of execution of the set of rules to determine 570 if the content item complies with the policies of the selected content publishing platform. For example, the content analyzer 240 may use the results of execution of one or more rules associated with the selected content publishing platform to determine that one or more policies of the content publishing platform are violated, for example, if the rules evaluate to a false result.

If the content item complies with the rules and policies of one or more additional content publishing platform 150 (in addition to the content publishing platform identified by the content provider system), the content analyzer 240 sends 580 a recommendation to the content provider system 105 that provided the content item, indicating that the content item qualifies for publication in these one or more additional content publishing platform 150.

If the content does not comply with the rules in a given platform, the online system 100 determines if certain modifications can be made to the content item that would result in compliance of the violated rules or policies of the content publishing platform. The content analyzer 240 sends 590 recommendations of these modifications to the content item content to the content provider system.

In an embodiment, the online system 100 receives a modified content item from the content provider system 105. The online system 100 executes the process illustrated in the FIG. 5 to determine whether the modified content item received complies with the various content publishing platforms. In some embodiments, the online system 100 makes the required modifications to the content item to ensure that the content item complies with the policies violated and sends the modified content item to the content provider system 105 for approval. If the online system 100 receives an approval for the modifications, the online system proceeds with delivery of the modified content item. The online system 100 delivers 595 the content item via the content publishing systems 150 that are approved by the content provider system 105.

Alternative Embodiments

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments of the disclosure is intended to be illustrative, but not limiting, of the scope of the disclosure, which is set forth in the following claims.

What is claimed is:

1. A method comprising:
   maintaining, by an online system, a plurality of content publishing platforms, each content publishing platform enforcing a set of policies, the set of policies determining whether a content item qualifies for publication via the content publishing platform;
   receiving, by the online system, from a content provider, a content item and an indication from the content provider to publish the content item on a first content publishing platform from the plurality of content publishing platforms, the content comprising one or more of text and media;
   identifying metadata of the content item describing one or more attributes of the one or more text and media of the content item;
   comparing the metadata of the content item to the set of policies associated with a second content publishing platform that is different from the first content publishing platform indicated by the content provider;
   determining that the content item fails to comply with the set of policies associated with the second content publishing platform but a modification would result in compliance with the second content publishing platform;
   identifying, through the metadata, a component of the content item that causes the content item to fail to comply with the set of policies associated with the second content publishing platform;
   sending a recommendation to the content provider to publish the content item on the second publishing platform, the recommendation comprising a suggested change of the component to comply with the set of policies associated with the second content publish platform; and
   publishing, responsive to an approval received from the content provider, a modified content item on the second publishing platform.

2. The method of claim 1, further comprises comparing the metadata of the content item to a common set of rules of the online system to confirm that the content item complies with the common set of rules.

3. The method of claim 2, wherein comparing the metadata to the common set of rules comprises comparing text from the metadata with a predefined set of keywords.

4. The method of claim 1, wherein the content item comprises one of an image or a video, and the metadata comprises dimensions of the image or the video.

5. The method of claim 1, wherein the content item comprises an image, and the metadata comprises one or more tags associated with the image.

6. The method of claim 1, further comprising:
   sending a second recommendation to the content provider to publish the modified content item via the first content publishing platform.

7. The method of claim 1, wherein the content item comprises a media object, and a dimension of the media object is modified in the modified content item.

8. The method of claim 1, wherein the content item comprises a media object, and a resolution of the media object is modified in the modified content item.

9. The method of claim 1, wherein the recommendation includes the modified content item as an attachment.

10. The method of claim 1, wherein the first content publishing platform is a first social networking system and the second content publishing platform is a second social networking system.

11. A non-transitory computer readable medium configured to store instructions, when executed by one or more processors, cause the one or more processors to perform steps comprising:
    maintaining, by an online system, a plurality of content publishing platforms, each content publishing platform enforcing a set of policies, the set of policies determining whether a content item qualifies for publication via the content publishing platform;
    receiving, by the online system, from a content provider, a content item and an indication from the content provider to publish the content item on a first content publishing platform from the plurality of content publishing platforms, the content comprising one or more of text and media;
    identifying metadata of the content item describing one or more attributes of the one or more text and media of the content item;
    comparing the metadata of the content item to the set of policies associated with a second content publishing platform that is different from the first content publishing platform indicated by the content provider;
    determining that the content item fails to comply with the set of policies associated with the second content publishing platform but a modification would result in compliance with the second content publishing platform;
    identifying, through the metadata, a component of the content item that causes the content item to fail to comply with the set of policies associated with the second content publishing platform;
    sending a recommendation to the content provider to publish the content item on the second publishing platform, the recommendation comprising a suggested change of the component to comply with the set of policies associated with the second content publish platform; and publishing, responsive to an approval received from the content provider, a modified content item on the second publishing platform.

12. The non-transitory computer readable medium of claim 11, further comprises comparing the metadata of the content item to a common set of rules of the online system to confirm that the content item complies with the common set of rules.

13. The non-transitory computer readable medium of claim 12, wherein comparing the metadata to the common set of rules comprises comparing text from the metadata with a predefined set of keywords.

14. The non-transitory computer readable medium of claim 11, wherein the content item comprises one of an image or a video, and the metadata comprises dimensions of the image or the video.

15. The non-transitory computer readable medium of claim 11, wherein the content item comprises an image, and the metadata comprises one or more tags associated with the image.

16. The non-transitory computer readable medium of claim 11, further comprising:
sending a second recommendation to the content provider to publish the modified content item via the first content publishing platform.

17. The non-transitory computer readable medium of claim 11, wherein the content item comprises a media object, and a dimension of the media object is modified in the modified content item.

18. The non-transitory computer readable medium of claim 11, wherein the content item comprises a media object, and a resolution of the media object is modified in the modified content item.

19. The non-transitory computer readable medium of claim 11, wherein the recommendation includes the modified content item as an attachment.

20. The non-transitory computer readable medium of claim 11, wherein the first content publishing platform is a first social networking system and the second content publishing platform is a second social networking system.

* * * * *